United States Patent
Mordani et al.

(10) Patent No.: US 12,250,267 B2
(45) Date of Patent: *Mar. 11, 2025

(54) SYSTEM AND METHOD FOR SUPPORTING PARTITIONS IN A MULTITENANT APPLICATION SERVER ENVIRONMENT

(71) Applicant: ORACLE INTERNATIONAL CORPORATION, Redwood Shores, CA (US)

(72) Inventors: Rajiv Mordani, Sunnyvale, CA (US); Nazrul Islam, Santa Clara, CA (US); Joseph Di Pol, Sunnyvale, CA (US); Peter Bower, Hollis, NH (US); Timothy Quinn, Lake Forest, IL (US); Lawrence Feigen, Watchung, NJ (US); Abhijit Kumar, Cupertino, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,683

(22) Filed: Oct. 17, 2022

(65) Prior Publication Data

US 2023/0032267 A1    Feb. 2, 2023

Related U.S. Application Data

(63) Continuation of application No. 14/748,094, filed on Jun. 23, 2015, now Pat. No. 11,477,278.
(Continued)

(51) Int. Cl.
*H04L 47/783* (2022.01)
*G06F 9/50* (2006.01)
(Continued)

(52) U.S. Cl.
CPC ........ *H04L 67/1025* (2013.01); *G06F 9/5072* (2013.01); *G06F 9/5077* (2013.01);
(Continued)

(58) Field of Classification Search
None
See application file for complete search history.

(56) References Cited

U.S. PATENT DOCUMENTS 5,848,282 A    12/1998 Kang
5,983,225 A    11/1999 Anfindsen
(Continued)

FOREIGN PATENT DOCUMENTS

CN    101639835    2/2010
CN    102170457    8/2011
(Continued)

OTHER PUBLICATIONS

Kang, Junbin et al., "MultiLanes: Providing Virtualized Storage for OS-level Virtualization on Many Cores", 12th USENIX Conference on File and Storage Technologies (FAST '14), Feb. 17-20, 2014, Santa Clara, CA, ISBN 978-1-931971-08-9, 14 pages.
(Continued)

*Primary Examiner* — Tom Y Chang
(74) *Attorney, Agent, or Firm* — TUCKER ELLIS LLP

(57) ABSTRACT

In accordance with an embodiment, described herein is a system and method for supporting partitions in a multitenant application server environment. In accordance with an embodiment, an application server administrator (e.g., a WLS administrator) can create or delete partitions; while a partition administrator can administer various aspects of a partition, for example create resource groups, deploy applications to a specific partition, and reference specific realms for a partition. Resource groups can be globally defined at the domain, or can be specific to a partition. Applications can
(Continued)

be deployed to a resource group template at the domain level, or to a resource group scoped to a partition or scoped to the domain. The system can optionally associate one or more partitions with a tenant, for use by the tenant.

20 Claims, 8 Drawing Sheets

Related U.S. Application Data

(60) Provisional application No. 62/054,900, filed on Sep. 24, 2014, provisional application No. 62/016,468, filed on Jun. 24, 2014.

(51) Int. Cl.
   *H04L 67/01* (2022.01)
   *H04L 67/1025* (2022.01)
   *H04L 47/70* (2022.01)
   *H04L 67/10* (2022.01)
   *H04L 67/1097* (2022.01)

(52) U.S. Cl.
   CPC ............ *H04L 47/783* (2013.01); *H04L 67/01* (2022.05); *H04L 47/70* (2013.01); *H04L 67/10* (2013.01); *H04L 67/1097* (2013.01)

(56) References Cited

U.S. PATENT DOCUMENTS

| | | | |
|---|---|---|---|
| 6,052,695 | A | 4/2000 | Abe |
| 6,260,068 | B1 | 7/2001 | Zalewski |
| 6,272,675 | B1 | 8/2001 | Schrab |
| 6,275,843 | B1 | 8/2001 | Chorn |
| 6,578,041 | B1 | 6/2003 | Lomet |
| 6,625,601 | B1 | 9/2003 | Molloy |
| 6,725,317 | B1 | 4/2004 | Bouchier |
| 7,082,432 | B2 | 7/2006 | Bhogi |
| 7,228,455 | B2 | 6/2007 | Pavlik |
| 7,289,964 | B1 | 10/2007 | Bowman-Amuah |
| 7,290,056 | B1 | 10/2007 | McLaughlin |
| 7,478,099 | B1 | 1/2009 | Gandhi |
| 7,519,181 | B2 | 4/2009 | Shaheen |
| 7,539,746 | B2 | 5/2009 | Bankier |
| 7,561,520 | B2 | 7/2009 | Holloway |
| 7,631,107 | B2 | 12/2009 | Pandya |
| 7,730,091 | B2 | 6/2010 | Buckler |
| 7,797,306 | B1 | 9/2010 | Pather |
| 7,831,772 | B2 | 11/2010 | Nalawade |
| 7,844,851 | B2 | 11/2010 | Cosmadopoulos |
| 7,895,475 | B2 | 2/2011 | Kulkarni |
| 7,941,804 | B1 | 5/2011 | Herington |
| 8,060,857 | B2 | 11/2011 | Biggerstaff |
| 8,078,737 | B2 | 12/2011 | Cosmadopoulos |
| 8,117,153 | B2 | 2/2012 | Cattell |
| 8,195,613 | B2 | 6/2012 | Vukojevic |
| 8,250,185 | B2 | 8/2012 | Bauer |
| 8,326,876 | B1 | 12/2012 | Venkataraman |
| 8,392,564 | B1 | 3/2013 | Czajkowski |
| 8,429,630 | B2 | 4/2013 | Nickolov |
| 8,472,929 | B2 | 6/2013 | Cotevino |
| 8,495,067 | B2 | 7/2013 | Ripberger |
| 8,601,473 | B1 | 12/2013 | Aron |
| 8,650,299 | B1 | 2/2014 | Huang |
| 8,688,923 | B2 | 4/2014 | Jacobs |
| 8,706,772 | B2 | 4/2014 | Hartig |
| 8,713,295 | B2 | 4/2014 | Bax |
| 8,743,872 | B2 | 6/2014 | Chidambaram |
| 8,775,626 | B2 | 7/2014 | Teather |
| 8,776,050 | B2 | 7/2014 | Plouffe |
| 8,838,534 | B2 | 9/2014 | Fowler |
| 8,880,638 | B2 | 11/2014 | Jeswani |
| 8,892,509 | B2 | 11/2014 | Cattell |
| 8,914,406 | B1 | 12/2014 | Haugsnes |
| 8,924,346 | B2 | 12/2014 | Colrain |
| 8,954,588 | B1 | 2/2015 | Bertz |
| 8,959,185 | B2 | 2/2015 | Nakil |
| 8,984,170 | B2 | 3/2015 | Colrain |
| 9,009,116 | B2 | 4/2015 | Cattell |
| 9,063,763 | B2 | 6/2015 | Astete |
| 9,104,453 | B2 | 8/2015 | Anand |
| 9,146,944 | B2 | 9/2015 | Parkinson |
| 9,389,922 | B2 | 7/2016 | Bauer |
| 9,405,530 | B2 | 8/2016 | Islam |
| 9,420,034 | B2 | 8/2016 | Cai |
| 9,436,626 | B2 | 9/2016 | Marietta |
| 9,460,169 | B2 | 10/2016 | Hinton |
| 9,509,553 | B2 | 11/2016 | Levy |
| 9,519,795 | B2 | 12/2016 | Guarrieri |
| 9,524,186 | B2 | 12/2016 | Shen |
| 9,578,009 | B2 | 2/2017 | Hopkins |
| 9,600,500 | B1 | 3/2017 | Gupta |
| 9,621,435 | B2 | 4/2017 | Vasudevan |
| 9,621,668 | B2 | 4/2017 | Kamath |
| 9,667,430 | B2 | 5/2017 | Connelly |
| 9,697,052 | B2 | 7/2017 | Dipol |
| 9,747,137 | B2 | 8/2017 | Quinn |
| 9,774,401 | B1 | 9/2017 | Borrill |
| 9,792,099 | B2 | 10/2017 | Zhang |
| 9,799,017 | B1 | 10/2017 | Vermeulen |
| 9,807,119 | B2 | 10/2017 | Watson |
| 9,811,386 | B2 | 11/2017 | Nanjundaswamy |
| 9,819,609 | B2 | 11/2017 | Nanjundaswamy |
| 9,843,629 | B2 | 12/2017 | Abdelaziz |
| 9,906,601 | B2 | 2/2018 | Zhang |
| 9,922,045 | B2 | 3/2018 | Yan |
| 9,930,129 | B2 | 3/2018 | Felts |
| 9,959,421 | B2 | 5/2018 | Inamdar |
| 9,961,011 | B2 | 5/2018 | Mordani |
| 9,967,324 | B2 | 5/2018 | Somogyi |
| 9,971,671 | B2 | 5/2018 | Inamdar |
| 9,973,511 | B2 | 5/2018 | Ott |
| 9,977,681 | B2 | 5/2018 | Patel |
| 10,007,691 | B2 | 6/2018 | Gleeson |
| 10,009,225 | B2 | 6/2018 | Mares |
| 10,009,425 | B1 | 6/2018 | Shavell |
| 10,015,242 | B2 | 7/2018 | Konkus |
| 10,027,550 | B2 | 7/2018 | Lam |
| 10,027,595 | B2 | 7/2018 | Lai |
| 10,038,645 | B2 | 7/2018 | Patel |
| 10,050,903 | B2 | 8/2018 | Sahoo |
| 10,051,043 | B2 | 8/2018 | Kasso |
| 10,084,723 | B2 | 9/2018 | Mordani |
| 10,084,843 | B2 | 9/2018 | Liu |
| 10,091,135 | B2 | 10/2018 | Sahoo |
| 10,097,589 | B2 | 10/2018 | Hopkins |
| 10,103,946 | B2 | 10/2018 | Xiao |
| 10,104,011 | B2 | 10/2018 | Sahoo |
| 10,114,678 | B2 | 10/2018 | Sabin |
| 10,122,596 | B2 | 11/2018 | Mordani |
| 10,178,184 | B2 | 1/2019 | Dorr |
| 10,187,454 | B2 | 1/2019 | Sengodan |
| 10,193,754 | B2 | 1/2019 | Lu |
| 10,216,758 | B2 | 2/2019 | Gummaraju |
| 10,225,209 | B2 | 3/2019 | Inamdar |
| 10,250,512 | B2 | 4/2019 | Sidde |
| 10,284,486 | B2 | 5/2019 | Thyagarajan |
| 10,310,841 | B2 | 6/2019 | Mutreja |
| 10,318,280 | B2 | 6/2019 | Islam |
| 10,339,127 | B2 | 7/2019 | Colrain |
| 10,348,565 | B2 | 7/2019 | Kannan |
| 10,348,822 | B2 | 7/2019 | Phan |
| 10,356,161 | B2 | 7/2019 | Bajaj |
| 10,382,537 | B2 | 8/2019 | Mordani |
| 10,439,953 | B2 | 10/2019 | Patel |
| 10,452,387 | B2 | 10/2019 | Lindholm |
| 10,462,068 | B2 | 10/2019 | Mordani |
| 10,467,061 | B2 | 11/2019 | Quinn |
| 10,469,401 | B2 | 11/2019 | Mordani |
| 10,474,998 | B2 | 11/2019 | Xiao |
| 10,476,938 | B2 | 11/2019 | Barnes |
| 10,523,709 | B2 | 12/2019 | Bower |
| 10,587,580 | B2 | 3/2020 | Subbarayan |

(56) References Cited

U.S. PATENT DOCUMENTS

| | | |
|---|---|---|
| 10,594,619 B2 | 3/2020 | Kasso |
| 10,635,491 B2 | 4/2020 | Islam |
| 10,642,800 B2 | 5/2020 | Gummaraju |
| 10,715,472 B2 | 7/2020 | Gambino |
| 10,742,568 B2 | 8/2020 | Mordani |
| 10,805,350 B2 | 10/2020 | Koul |
| 10,860,384 B2 | 12/2020 | Wang |
| 10,868,721 B2 | 12/2020 | Schneider |
| 10,873,627 B2 | 12/2020 | Gleyzer |
| 11,057,272 B2 | 7/2021 | Parkinson |
| 11,070,559 B2 | 7/2021 | Xiao |
| 11,075,799 B2 | 7/2021 | Nelson |
| 11,138,017 B2 | 10/2021 | Dipol |
| 11,188,427 B2 | 11/2021 | Parkinson |
| 11,237,814 B2 | 2/2022 | Lindholm |
| 11,477,278 B2 | 10/2022 | Mordani |
| 11,544,149 B2 | 1/2023 | Srinivasan |
| 2002/0083078 A1 | 6/2002 | Pardon |
| 2002/0087366 A1 | 7/2002 | Collier |
| 2002/0188538 A1 | 12/2002 | Robertson |
| 2003/0046342 A1 | 3/2003 | Felt |
| 2003/0084056 A1 | 5/2003 | DeAnna |
| 2003/0105768 A1 | 6/2003 | Berkowitz |
| 2004/0015600 A1 | 1/2004 | Tiwary |
| 2004/0068501 A1 | 4/2004 | McGoveran |
| 2004/0216109 A1 | 10/2004 | Bhogi |
| 2004/0220933 A1 | 11/2004 | Walker |
| 2004/0225915 A1 | 11/2004 | Johnson |
| 2004/0255298 A1 | 12/2004 | Dorrance |
| 2005/0015353 A1 | 1/2005 | Kumar |
| 2005/0125445 A1 | 6/2005 | Cotner |
| 2005/0187891 A1 | 8/2005 | Johnson |
| 2005/0216421 A1 | 9/2005 | Barry |
| 2005/0262077 A1 | 11/2005 | Barnes |
| 2005/0271051 A1 | 12/2005 | Holloway |
| 2006/0036747 A1 | 2/2006 | Galvin |
| 2006/0075277 A1 | 4/2006 | Johnson |
| 2006/0111880 A1 | 5/2006 | Brown |
| 2006/0174224 A1 | 8/2006 | Parkinson |
| 2006/0179125 A1 | 8/2006 | Pavlik |
| 2006/0190243 A1 | 8/2006 | Barkai |
| 2006/0190504 A1 | 8/2006 | Pruet |
| 2007/0028208 A1 | 2/2007 | Maki |
| 2007/0028244 A1 | 2/2007 | Landis |
| 2007/0043784 A1 | 2/2007 | Parkinson |
| 2007/0061441 A1 | 3/2007 | Landis |
| 2007/0067266 A1 | 3/2007 | Lomet |
| 2007/0067366 A1 | 3/2007 | Landis |
| 2007/0143261 A1 | 6/2007 | Uppala |
| 2007/0143339 A1 | 6/2007 | Springett |
| 2007/0198681 A1 | 8/2007 | Bakke |
| 2007/0220302 A1 | 9/2007 | Cline |
| 2007/0226218 A1 | 9/2007 | Chatterjee |
| 2007/0261054 A1 | 11/2007 | Chesebro |
| 2008/0010287 A1 | 1/2008 | Hinton |
| 2008/0134219 A1 | 6/2008 | Dorrance |
| 2008/0189679 A1 | 8/2008 | Rodriguez |
| 2008/0196029 A1 | 8/2008 | Doty |
| 2008/0235295 A1 | 9/2008 | Parkinson |
| 2008/0250074 A1 | 10/2008 | Parkinson |
| 2009/0007097 A1 | 1/2009 | Hinton |
| 2009/0037452 A1 | 2/2009 | Baitalmal |
| 2009/0037492 A1 | 2/2009 | Baitalmal |
| 2009/0077135 A1 | 3/2009 | Yalamanchi |
| 2009/0094252 A1 | 4/2009 | Wong |
| 2009/0118839 A1 | 5/2009 | Accapadi |
| 2009/0182787 A1 | 7/2009 | Parkinson |
| 2009/0222823 A1 | 9/2009 | Parkinson |
| 2009/0275314 A1 | 11/2009 | Cotevino |
| 2009/0276771 A1* | 11/2009 | Nickolov ............... G06Q 30/04 |
| | | 718/1 |
| 2009/0300023 A1 | 12/2009 | Vaghani |
| 2010/0030995 A1* | 2/2010 | Wang ............... G06F 16/2282 |
| | | 711/E12.001 |
| 2010/0080241 A1 | 4/2010 | Cosmadopoulos |
| 2010/0106842 A1 | 4/2010 | Cosmadopoulos |
| 2010/0169289 A1 | 7/2010 | Newport |
| 2010/0299664 A1* | 11/2010 | Taylor ..................... G06F 8/65 |
| | | 717/173 |
| 2011/0035356 A1 | 2/2011 | Vukojevic |
| 2011/0041006 A1 | 2/2011 | Fowler |
| 2011/0093435 A1 | 4/2011 | Zha |
| 2011/0093469 A1 | 4/2011 | B'Far |
| 2011/0145204 A1 | 6/2011 | Maple |
| 2011/0213870 A1 | 9/2011 | Cai |
| 2011/0238630 A1 | 9/2011 | Nishigaki |
| 2011/0238795 A1 | 9/2011 | Bauer |
| 2011/0271005 A1 | 11/2011 | Bharrat |
| 2011/0276579 A1 | 11/2011 | Colrain |
| 2011/0307450 A1 | 12/2011 | Hahn |
| 2012/0047126 A1 | 2/2012 | Branscome |
| 2012/0072597 A1 | 3/2012 | Teather |
| 2012/0110566 A1 | 5/2012 | Park |
| 2012/0173581 A1 | 7/2012 | Hartig |
| 2012/0173589 A1 | 7/2012 | Kwon |
| 2012/0179646 A1 | 7/2012 | Hinton |
| 2012/0296883 A1 | 11/2012 | Ganesh |
| 2013/0024863 A1 | 1/2013 | Parkinson |
| 2013/0066837 A1 | 3/2013 | Colrain |
| 2013/0066948 A1 | 3/2013 | Colrain |
| 2013/0066949 A1 | 3/2013 | Colrain |
| 2013/0066952 A1 | 3/2013 | Colrain |
| 2013/0085996 A1 | 4/2013 | Tian |
| 2013/0103654 A1 | 4/2013 | Mclachlan |
| 2013/0132458 A1 | 5/2013 | Little |
| 2013/0204917 A1 | 8/2013 | Wang |
| 2013/0246368 A1 | 9/2013 | Parkinson |
| 2013/0246379 A1 | 9/2013 | Shen |
| 2013/0246845 A1 | 9/2013 | Parkinson |
| 2013/0290524 A1 | 10/2013 | Liu |
| 2013/0290960 A1 | 10/2013 | Astete |
| 2013/0304714 A1 | 11/2013 | Lee |
| 2013/0332577 A1 | 12/2013 | Nakil |
| 2013/0339470 A1* | 12/2013 | Jeswani ................. H04L 67/568 |
| | | 709/213 |
| 2013/0346380 A1 | 12/2013 | Dong |
| 2013/0346967 A1 | 12/2013 | Anand |
| 2014/0032228 A1* | 1/2014 | Johri ................... G06F 21/6227 |
| | | 705/1.1 |
| 2014/0047150 A1 | 2/2014 | Marietta |
| 2014/0047439 A1 | 2/2014 | Levy |
| 2014/0075019 A1 | 3/2014 | Mordani |
| 2014/0075032 A1* | 3/2014 | Vasudevan .......... H04L 41/5048 |
| | | 709/226 |
| 2014/0075565 A1 | 3/2014 | Srinivasan |
| 2014/0149483 A1 | 5/2014 | Mitchell |
| 2014/0157276 A1 | 6/2014 | Smithson |
| 2014/0250436 A1 | 9/2014 | Tang |
| 2014/0279899 A1 | 9/2014 | Gu |
| 2014/0304299 A1 | 10/2014 | Yan |
| 2014/0330767 A1 | 11/2014 | Fowler |
| 2014/0344782 A1 | 11/2014 | Hill |
| 2014/0358972 A1 | 12/2014 | Guarrieri |
| 2014/0373007 A1* | 12/2014 | Donnellan ........... G06F 9/45545 |
| | | 718/1 |
| 2015/0089068 A1 | 3/2015 | Islam |
| 2015/0089274 A1 | 3/2015 | Mares |
| 2015/0120791 A1 | 4/2015 | Gummaraju |
| 2015/0121371 A1 | 4/2015 | Gummaraju |
| 2015/0207758 A1 | 7/2015 | Mordani |
| 2015/0212850 A1 | 7/2015 | Little |
| 2015/0234682 A1 | 8/2015 | Dageville |
| 2015/0235014 A1* | 8/2015 | Evans ..................... H04L 67/10 |
| | | 726/26 |
| 2015/0277974 A1 | 10/2015 | Beale |
| 2015/0281336 A1 | 10/2015 | Beale |
| 2015/0309889 A1 | 10/2015 | Campbell |
| 2015/0319265 A1 | 11/2015 | DeRoo |
| 2015/0370549 A1 | 12/2015 | Zhang |
| 2015/0372883 A1 | 12/2015 | Lam |
| 2015/0372887 A1 | 12/2015 | Inamdar |
| 2015/0372936 A1 | 12/2015 | Kasso |
| 2015/0372937 A1 | 12/2015 | Lai |
| 2015/0372938 A1 | 12/2015 | Patel |

(56) References Cited

U.S. PATENT DOCUMENTS

| | | |
|---|---|---|
| 2015/0372941 A1 | 12/2015 | Patel |
| 2015/0373004 A1 | 12/2015 | Hopkins |
| 2015/0373097 A1 | 12/2015 | Konkus |
| 2015/0373098 A1 | 12/2015 | Mordani |
| 2015/0373099 A1 | 12/2015 | Dipol |
| 2015/0373117 A1 | 12/2015 | Gleyzer |
| 2016/0013983 A1 | 1/2016 | Lu |
| 2016/0014038 A1 | 1/2016 | Thyagarajan |
| 2016/0014191 A1 | 1/2016 | Liu |
| 2016/0014212 A1 | 1/2016 | Zhang |
| 2016/0020949 A1 | 1/2016 | Mares |
| 2016/0070589 A1 | 3/2016 | Vermeulen |
| 2016/0085543 A1 | 3/2016 | Islam |
| 2016/0085772 A1 | 3/2016 | Vermeulen |
| 2016/0086260 A1 | 3/2016 | Vermeulen |
| 2016/0088108 A1 | 3/2016 | Felts |
| 2016/0092319 A1 | 3/2016 | Parkinson |
| 2016/0092342 A1 | 3/2016 | Inamdar |
| 2016/0094403 A1 | 3/2016 | Somogyi |
| 2016/0094404 A1 | 3/2016 | Kasso |
| 2016/0094405 A1 | 3/2016 | Barnes |
| 2016/0094406 A1 | 3/2016 | Phan |
| 2016/0094407 A1 | 3/2016 | Parkinson |
| 2016/0094408 A1 | 3/2016 | Segu |
| 2016/0094473 A1 | 3/2016 | Mordani |
| 2016/0094474 A1 | 3/2016 | Sahoo |
| 2016/0094478 A1 | 3/2016 | Quinn |
| 2016/0094484 A1 | 3/2016 | Mordani |
| 2016/0094486 A1 | 3/2016 | Sahoo |
| 2016/0094498 A1 | 3/2016 | Xiao |
| 2016/0094510 A1 | 3/2016 | Xiao |
| 2016/0094582 A1 | 3/2016 | Watson |
| 2016/0094583 A1 | 3/2016 | Bower |
| 2016/0094624 A1 | 3/2016 | Mordani |
| 2016/0094625 A1 | 3/2016 | Sengodan |
| 2016/0094626 A1 | 3/2016 | Bajaj |
| 2016/0094627 A1 | 3/2016 | Subramanyam |
| 2016/0094635 A1 | 3/2016 | Kannan |
| 2016/0094647 A1 | 3/2016 | Mordani |
| 2016/0099948 A1 | 4/2016 | Ott |
| 2016/0142506 A1 | 5/2016 | Sahoo |
| 2016/0210322 A1 | 7/2016 | Little |
| 2016/0231998 A1 | 8/2016 | Islam |
| 2016/0314162 A1 | 10/2016 | Tarta |
| 2016/0328268 A1 | 11/2016 | Islam |
| 2016/0371356 A1 | 12/2016 | Lee |
| 2017/0017494 A1 | 1/2017 | Patel |
| 2017/0019467 A1 | 1/2017 | Inamdar |
| 2017/0019485 A1 | 1/2017 | Dorr |
| 2017/0034071 A1 | 2/2017 | Sidde |
| 2017/0091231 A1 | 3/2017 | DiFranco |
| 2017/0116041 A1 | 4/2017 | Nanjundaswamy |
| 2017/0118137 A1 | 4/2017 | Nanjundaswamy |
| 2017/0126742 A1 | 5/2017 | Hopkins |
| 2017/0177697 A1 | 6/2017 | Lee |
| 2017/0177698 A1 | 6/2017 | Lee |
| 2017/0192772 A1 | 7/2017 | Islam |
| 2017/0220621 A1 | 8/2017 | Colrain |
| 2017/0221140 A1 | 8/2017 | Melamed |
| 2018/0041382 A1 | 2/2018 | Bhan |
| 2018/0081673 A1 | 3/2018 | Mutreja |
| 2018/0081676 A1 | 3/2018 | Lindholm |
| 2018/0081694 A1 | 3/2018 | Dipol |
| 2018/0115523 A1 | 4/2018 | Subbarayan |
| 2018/0227242 A1 | 8/2018 | Mordani |
| 2019/0056926 A1 | 2/2019 | Lindholm |
| 2019/0058632 A1 | 2/2019 | Schneider |
| 2019/0068440 A1 | 2/2019 | Nelson |
| 2019/0068536 A1 | 2/2019 | Gambino |
| 2019/0068606 A1 | 2/2019 | Xiao |
| 2019/0253457 A1 | 8/2019 | Koul |
| 2020/0213115 A1 | 7/2020 | Mathane |
| 2021/0208971 A1 | 7/2021 | Srinivasan |
| 2022/0058095 A1 | 2/2022 | Parkinson |
| 2023/0023262 A1 | 1/2023 | Islam |

FOREIGN PATENT DOCUMENTS

| | | |
|---|---|---|
| CN | 102236762 | 11/2011 |
| CN | 102333115 | 1/2012 |
| CN | 102460393 | 5/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103229450 | 7/2013 |
| CN | 103455512 | 12/2013 |
| CN | 103514245 | 1/2014 |
| CN | 103516777 | 1/2014 |
| CN | 103718533 | 4/2014 |
| CN | 103733194 | 4/2014 |
| CN | 103858118 | 6/2014 |
| CN | 104050201 | 9/2014 |
| CN | 104104513 | 10/2014 |
| CN | 104598249 | 5/2015 |
| JP | 2004503011 | 1/2004 |
| JP | 2005209029 | 8/2005 |
| JP | 2011232840 | 11/2011 |
| WO | 2014039866 | 3/2014 |

OTHER PUBLICATIONS

Sadamori et al., "Linux operates on IBM mainframe zSeries: Overview of mainframe Linux Part 4 Realization of allocating CPU and memory flexibly by LPAR", Monthly Linux Magazine, Aug. 1, 2014, vol. 6, No. 8, pp. 94-99, 8 pages.

Jia, Changyun et al., "Research on Multi-tenant PaaS Cloud Security on Java Platform", 2013 International Conference on Information Science and Cloud Computing Companion, pp. 260-266, 7 pages.

Kuhn, Darl, "Pro Oracle Database 12c Administration; Chapter 23: Pluggable Databases", Jul. 3, 2013, © 2013 Apress, pp. 667-697, 30 pages.

Wikipedia, "Application server", retrieved Mar. 5, 2021 from: <https://en.wikipedia.org/w/index.php?title=Application_server &oldid=584863280> 4 pages.

The Korean Intellectual Property Office, Notice of Office Action dated Mar. 16, 2023 for Korean Patent Application No. 10-2017-7037057, 6 pages.

United States Patent and Trademark Office, Office Communication dated Feb. 10, 2023 for U.S. Appl. No. 17/519,407, 51 pages.

United States Patent and Trademark Office, Office Communication dated Feb. 8, 2023 for U.S. Appl. No. 17/947,880, 33 pages.

United States Patent and Trademark Office, Notice of Allowance and Fee(s) Due dated Feb. 2, 2023 for U.S. Appl. No. 17/732,297, 18 pages.

European Patent Office, Summons to oral proceedings pursuant to Rule 115(1) EPC dated Jul. 12, 2023 for European Patent Application No. 15736357.3, 24 pages.

United States Patent and Trademark Office, Notice of Allowance and Fee(s) Due dated Jan. 19, 2024 for U.S. Appl. No. 17/519,407, 33 pages.

European Patent Office, Boards of Appeal, Datasheet for the decision of Sep. 26, 2023 for European Patent Application No. 15736357.3, 23 pages.

* cited by examiner

SYSTEM AND METHOD FOR SUPPORTING
PARTITIONS IN A MULTITENANT
APPLICATION SERVER ENVIRONMENT

CLAIM OF PRIORITY AND
CROSS-REFERENCE TO RELATED
APPLICATIONS

This application is a continuation of U.S. Patent Application titled "SYSTEM AND METHOD FOR SUPPORTING PARTITIONS IN A MULTITENANT APPLICATION SERVER ENVIRONMENT", application Ser. No. 14/748,094, filed Jun. 23, 2015; which claims the benefit of priority to U.S. Provisional Application titled "SYSTEM AND METHOD FOR SUPPORTING PARTITIONS IN A MULTITENANT APPLICATION SERVER ENVIRONMENT", Application No. 62/016,468, filed Jun. 24, 2014; and U.S. Provisional Application titled "SYSTEM AND METHOD FOR SUPPORTING PARTITIONS IN A MULTITENANT APPLICATION SERVER ENVIRONMENT", Application No. 62/054,900, filed Sep. 24, 2014; and is related to U.S. Patent Application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015, now U.S. Pat. No. 9,961,011 issued May 1, 2018; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting partitions in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for supporting partitions in a multitenant application server environment. In accordance with an embodiment, an application server administrator (e.g., a WLS administrator) can create or delete partitions; while a partition administrator can administer various aspects of a partition, for example create resource groups, deploy applications to a specific partition, and reference specific realms for a partition. Resource groups can be globally defined at the domain, or can be specific to a partition. Applications can be deployed to a resource group template at the domain level, or to a resource group scoped to a partition or scoped to the domain. The system can optionally associate one or more partitions with a tenant, for use by the tenant.

DETAILED DESCRIPTION

In accordance with an embodiment, described herein is a system and method for supporting partitions in a multitenant application server environment. In accordance with an embodiment, an application server administrator (e.g., a WLS administrator) can create or delete partitions; while a partition administrator can administer various aspects of a partition, for example create resource groups, deploy applications to a specific partition, and reference specific realms for a partition. Resource groups can be globally defined at the domain, or can be specific to a partition. Applications can be deployed to a resource group template at the domain level, or to a resource group scoped to a partition or scoped to the domain. The system can optionally associate one or more partitions with a tenant, for use by the tenant.

Application Server (e.g., Multi-Tenant, MT) Environment

Figure 1:
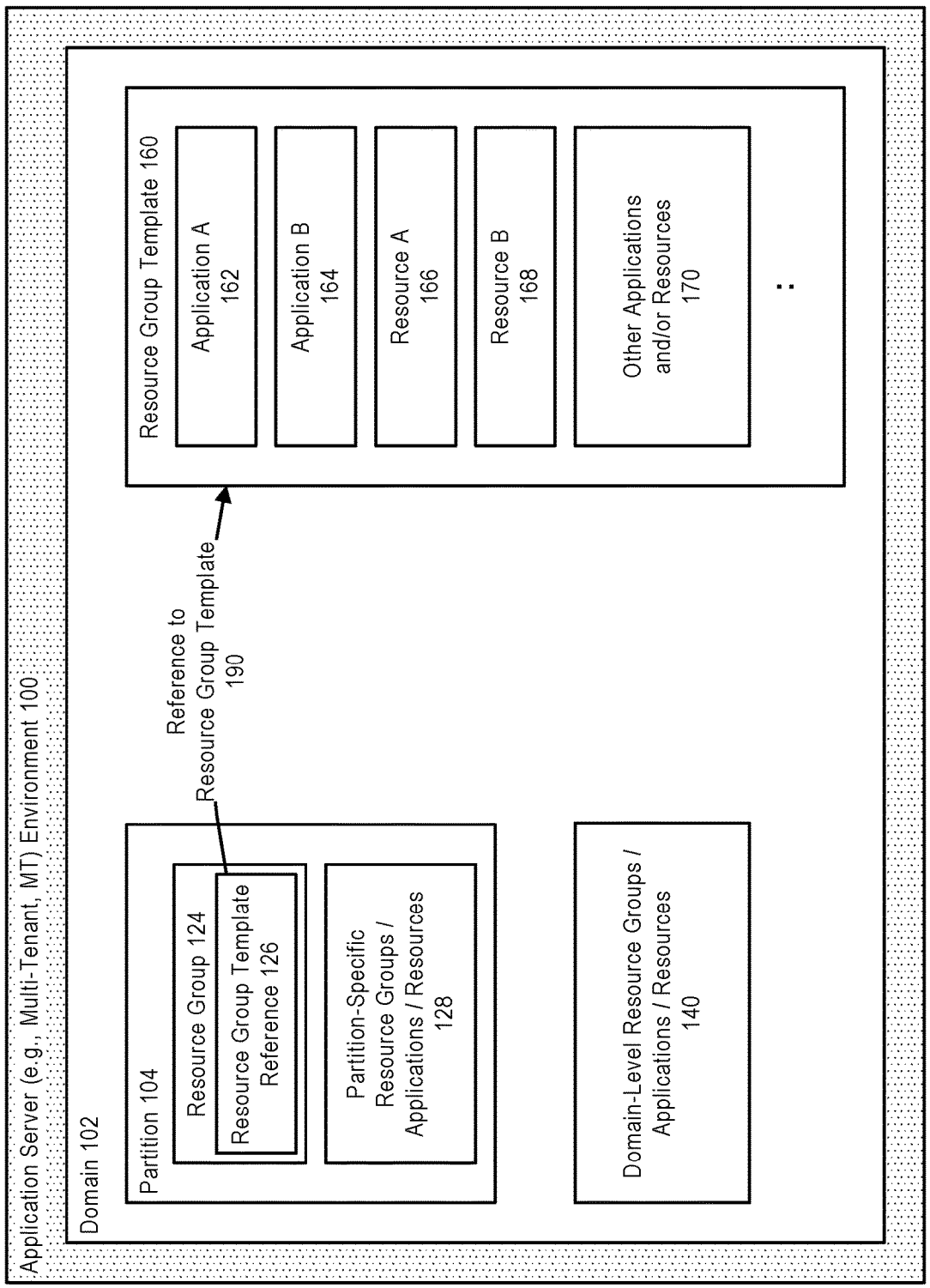
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
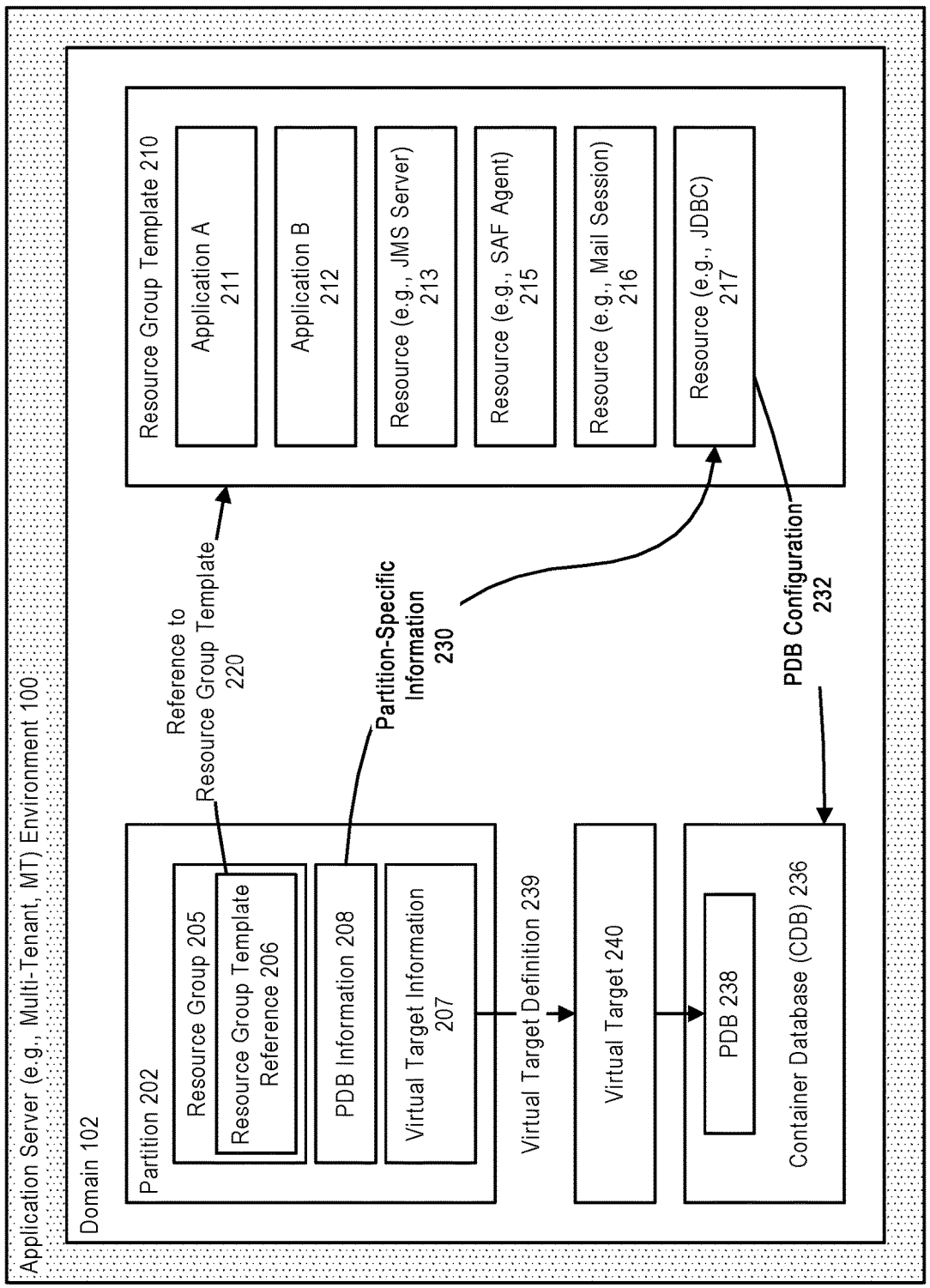
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
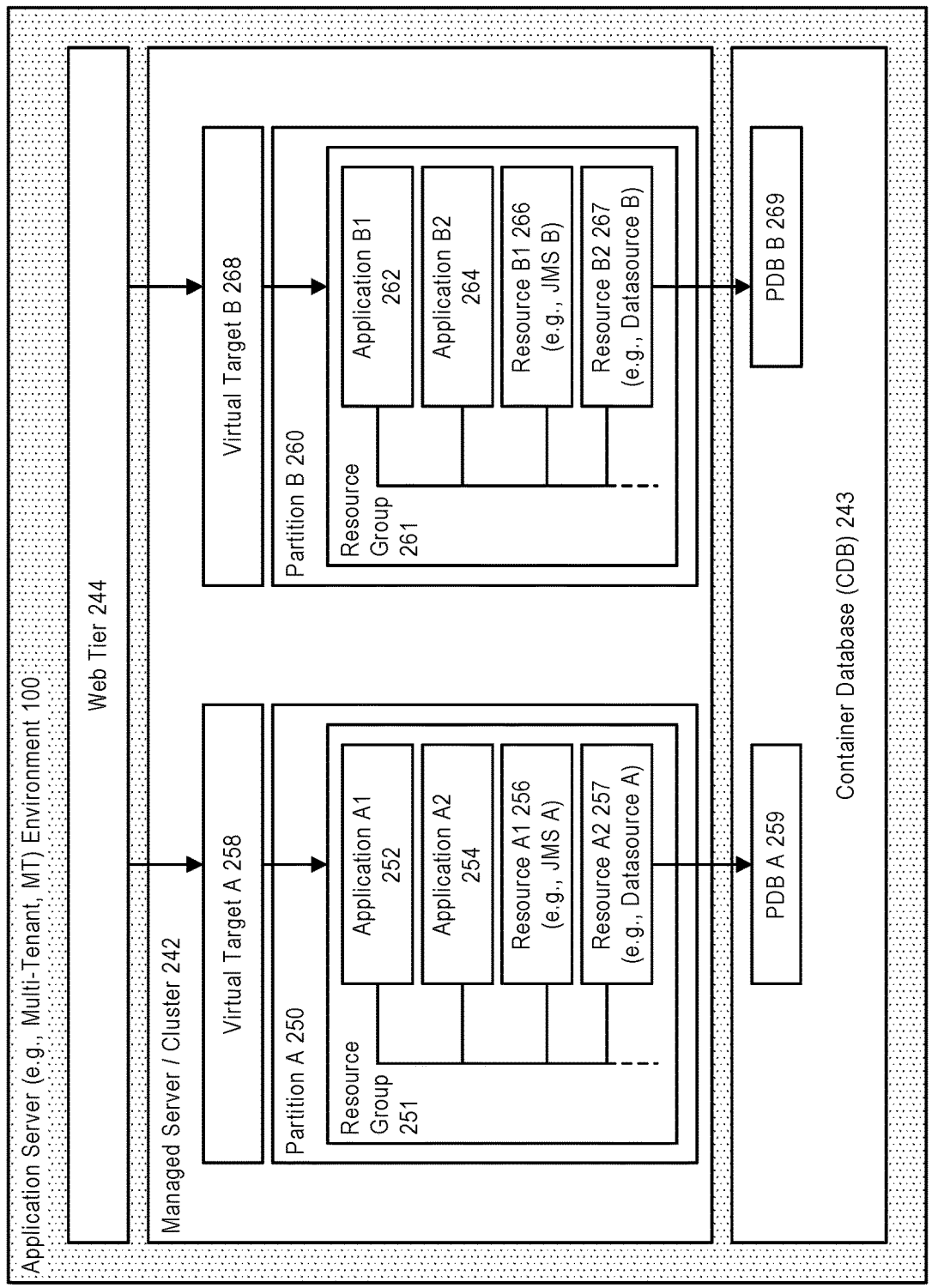
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRM Data Username}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
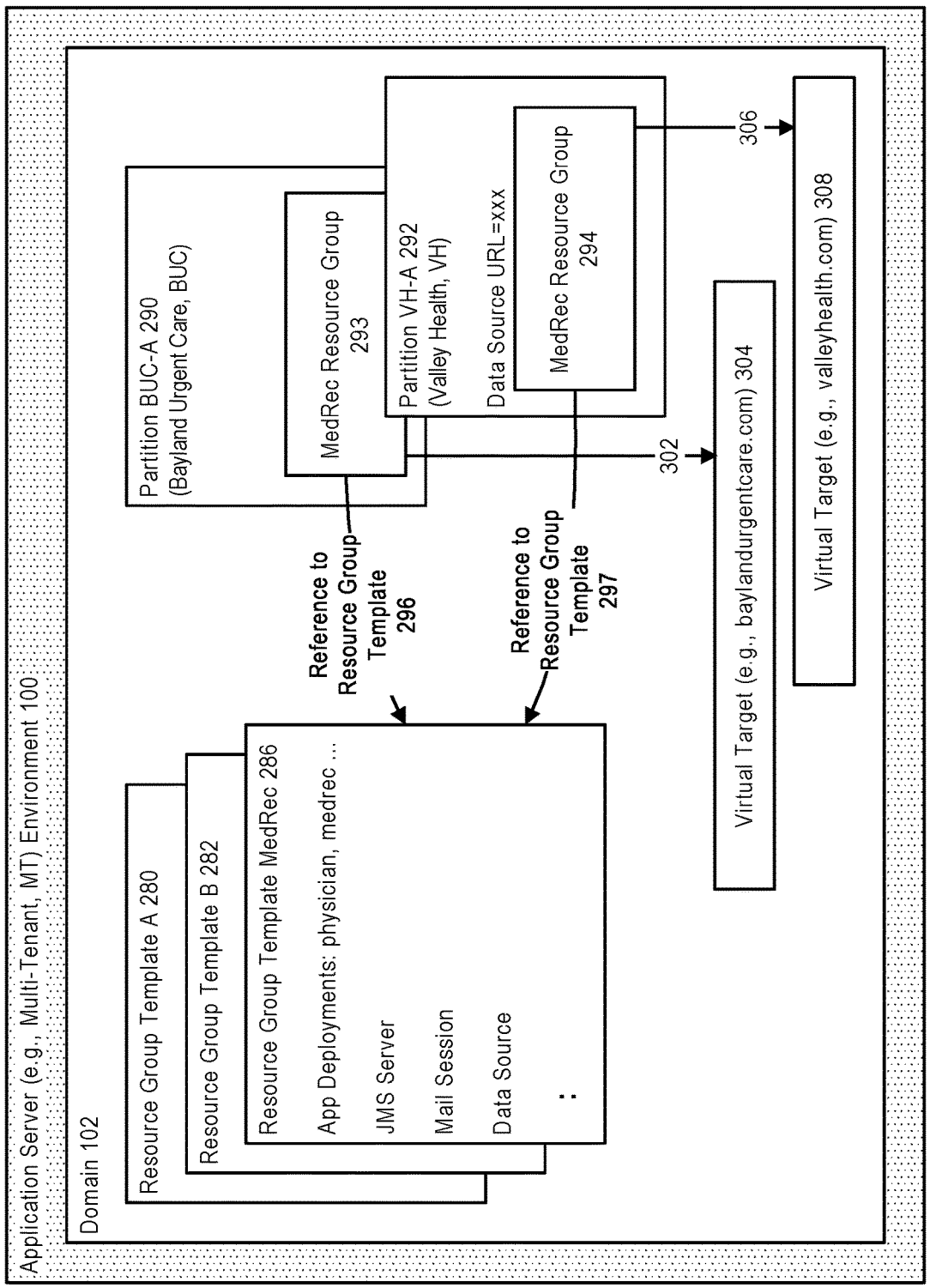
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
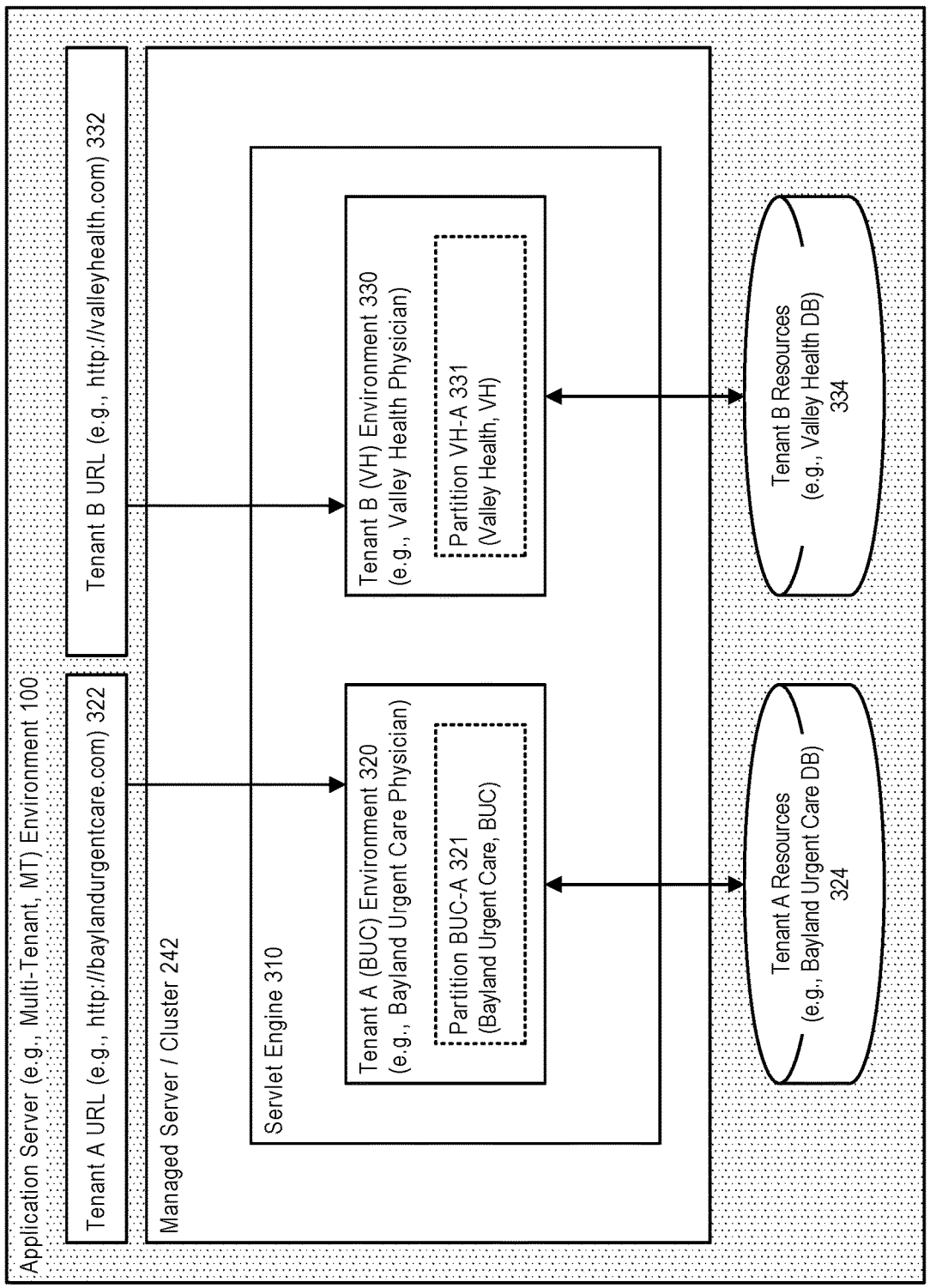
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Partition-Related Features

In accordance with an embodiment, an application server administrator (e.g., a WLS administrator) can create or delete partitions; while a partition administrator can administer various aspects of a partition, for example create resource groups, deploy applications to a specific partition, and reference specific realms for a partition. Resource groups can be globally defined at the domain, or can be specific to a partition. Applications can be deployed to a resource group template at the domain level, or to a resource group scoped to a partition or scoped to the domain. The system can optionally associate one or more partitions with a tenant, for use by the tenant.

Figure 6:
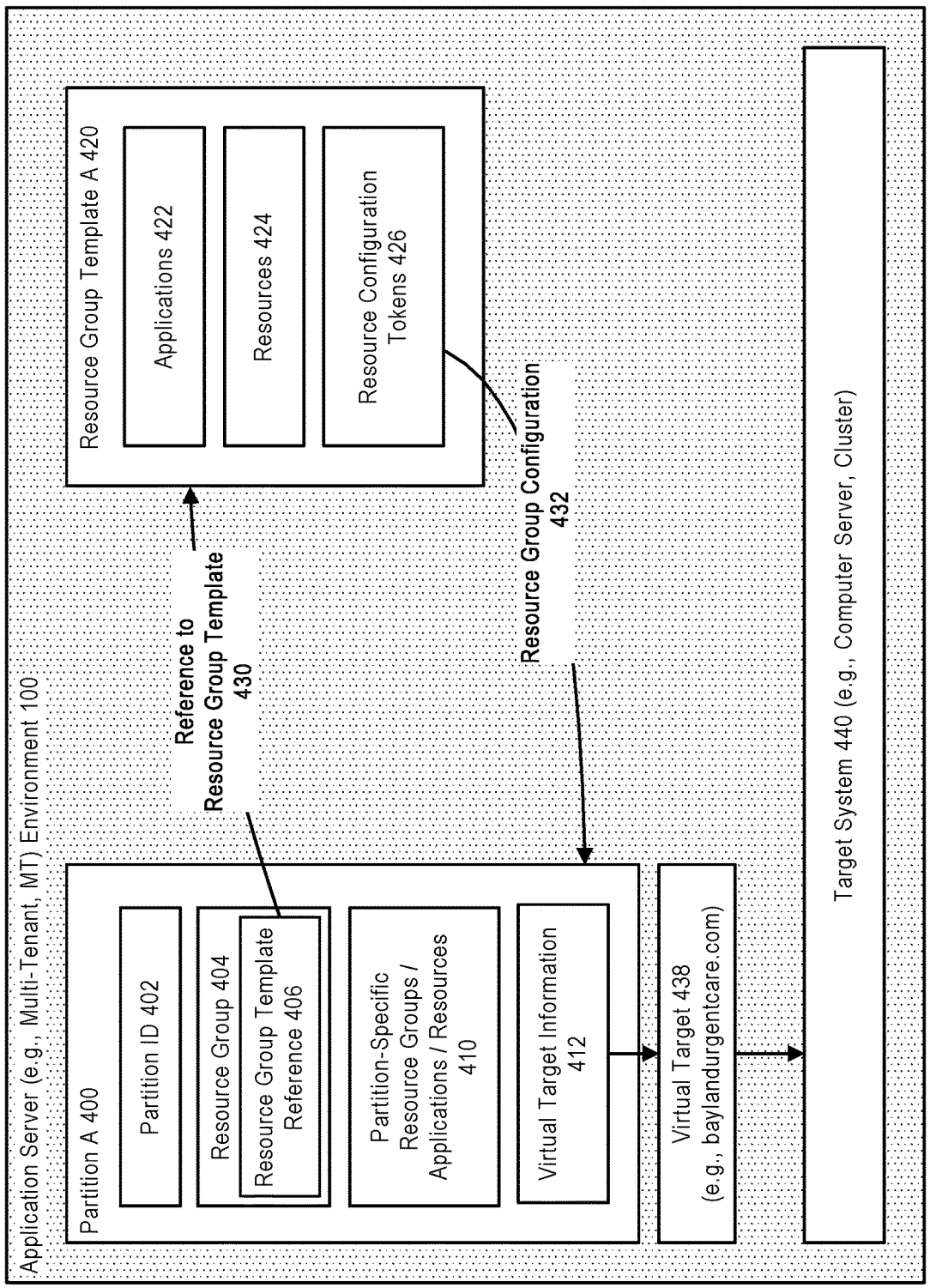
FIG. 6 illustrates the use of partitions in an application server, cloud, or other environment, in accordance with an embodiment.

FIG. 6 illustrates the use of partitions in an application server, cloud, or other environment, in accordance with an embodiment. As shown in FIG. 6, in accordance with an embodiment, a first or particular partition A 400 can be associated with a partition ID 402, resource group 404 with optional resource group template reference 406, and/or one or more partition-specific resource groups, applications or resources 410. A particular resource group template A 420 can define one or more applications 422, resources 424, or resource configuration tokens 426, such that when a resource group of a partition (e.g., Partition A) references 430 that resource group template, the applications, resources, and resource configuration tokens can be used to configure 432 the resource group, including defining a virtual target information 412 and/or associating a virtual target 438 (e.g., baylandurgentcare.com) with the resource group, which in turn is associated with a target system 440 (e.g., a computer server, or a cluster).

Figure 7:
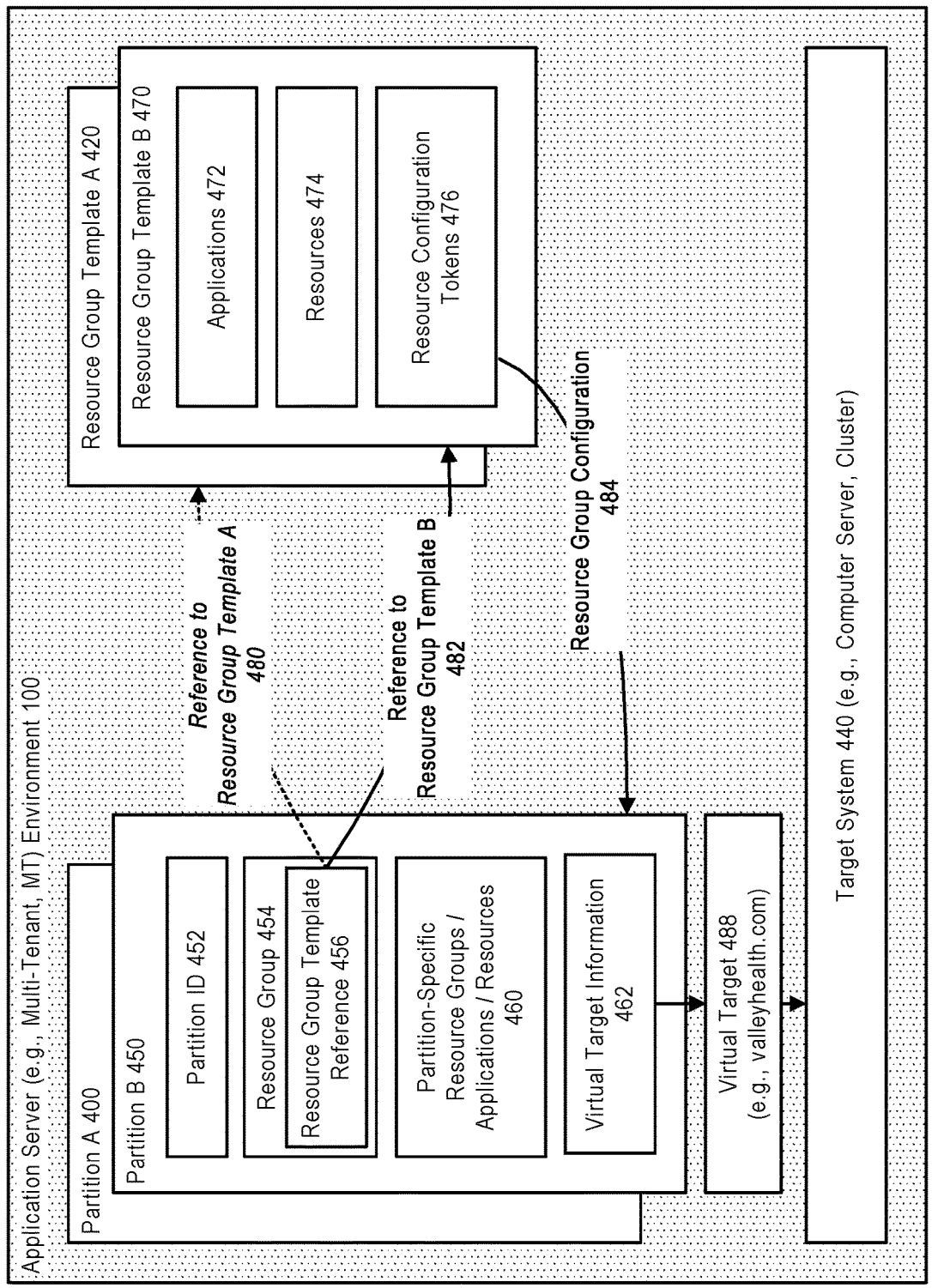
FIG. 7 further illustrates the use of partitions in an application server, cloud, or other environment, in accordance with an embodiment.

FIG. 7 further illustrates the use of partitions in an application server, cloud, or other environment, in accordance with an embodiment. As shown in FIG. 7, in accordance with an embodiment, a second partition B 450 can be similarly associated with a partition ID 452, resource group 454 with optional resource group template reference 456, and/or one or more partition-specific resource groups, applications or resources 460. A second resource group template B 470 can similarly define one or more applications 472, resources 474, or resource configuration tokens 476. A resource group of a partition (e.g., Partition B) can reference 480, 482 either of the resource group templates A and B, such that the applications, resources, and resource configuration tokens of the selected resource group template (in this example, resource group template B) can be used to configure 484 the resource group, including defining a virtual target information 462 and/or associating a virtual target 488 (e.g., valleyhealth.com) with the resource group, which in turn is associated with the target system.

Figure 8:
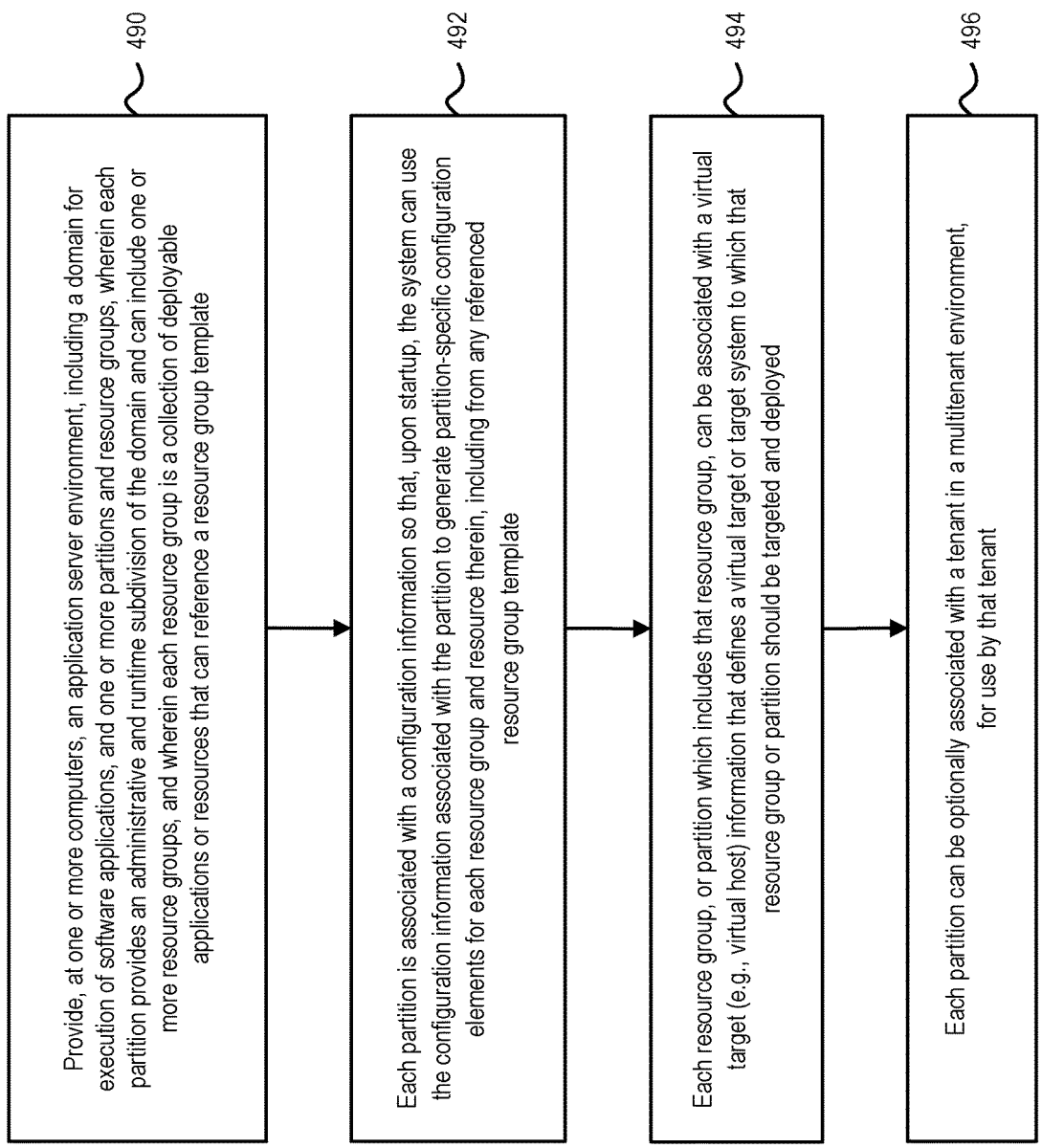
FIG. 8 illustrates a method of using partitions in an application server, cloud, or other environment, in accordance with an embodiment.

FIG. 8 illustrates a method of using partitions in an application server, cloud, or other environment, in accordance with an embodiment. As shown in FIG. 8, in accordance with an embodiment, at step 490, an application server environment is provided, including a domain for execution of software applications, and one or more partitions and resource groups, wherein each partition provides an administrative and runtime subdivision of the domain and can include one or more resource groups, and wherein each resource group is a collection of deployable applications or resources that can reference a resource group template.

At step 492, each partition is associated with a configuration information so that, upon startup, the system can use the configuration information associated with the partition to generate partition-specific configuration elements for each resource group and resource therein, including from any referenced resource group template.

At step 494, each resource group, or partition which includes that resource group, can be associated with a virtual target (e.g., virtual host) information that defines a target to which that resource group or partition should be targeted and deployed.

At step 496, each partition can be optionally associated with a tenant in a multitenant environment, for use by that tenant.

Partition Administration

In accordance with an embodiment, a system administrator can create, delete and migrate partitions; and can also create and assign targets. A partition administrator can administer various aspects of a partition at the partition level, for example creating resource groups, or deploying applications to a resource group within a partition. A system administrator can set or change the security characteristics of a partition (e.g., the security realm), or reference a shared (domain-level) resource group or resource group template.

Partition Name and Partition ID

In accordance with an embodiment, each partition has two identifiers: a partition name, which is a human-readable name that is specified at partition creation time, and is the identifier used by humans to administer the partition, and by code that prefers a human-friendly identifier; and a partition ID, which is a less readable name that is generated for a partition, for example as a UUID, and is therefore unique over time and space, and is used by code that needs a globally unique ID to differentiate between partitions. A partition's name and ID can be retrieved from both the partition config bean, and the invocation context (ComponentInvocationContext).

Partition Configuration

In accordance with an embodiment, the partition configuration is contained in config.xml and includes the following configuration elements:

partition—this is the top-level configuration element and contains the attributes and child elements that define the partition. The partition element will be defined at the domain level. A partition can contain resource groups, system resource override elements, and attributes that define the realm, network mapping to partition, SSL info, and other partition information.

resource-group—this element contains the applications and resources deployed to the partition.

A resource group can extend a resource group template so that common applications or resources can be defined in one place and shared among partitions. Names within a resource group must be unique across the partition—a validation error will occur if the same name is defined within different resource group template or resource groups.

resource-group-template—even though this element is defined at the domain level and contains applications and resources, since all the resource groups that reference a resource group template from within a partition get all the resources and applications, logically the resource group templates contain configuration that are specified for a partition.

configuration-properties—this element contains property key values. The configuration properties can be specified at both the partition level as well as the resource groups at the domain level. The model for partition-specific overrides is that most common attributes that need to be partition-specific should be contained in a child configuration element of the partition, which makes it easier for customers to specify commonly used partition-specific configuration via specific configuration elements.

Partition Portability

In accordance with an embodiment, a partition can be exported from one domain (e.g., source domain) and imported into another domain (e.g., target domain). Exporting a partition creates a partition archive that can be copied to another system and imported into the target domain, without requiring shutdown or restart of either domain.

Partition and Resource Group Migration

In accordance with an embodiment, a resource group within a partition can be migrated from one virtual target to another, thus enabling serviceability.

Tenant and Partition Relationship

In accordance with an embodiment, a tenant can be defined outside of the application server environment, for example in a Fusion Applications (FA) or Fusion Middleware (FMW) environment.

Mapping of Hosts and URLs to Partitions

In accordance with an embodiment, each container/request handler can establish a partition context and push it onto an invocation context manager (ComponentInvocationContext Manager), for subsequent use. A partition table can be used to help containers do this by providing a mapping from hostname/port/URL to partition name. Mapping to a partition can be accomplished by matching one or more of the following: Hostname (often a virtual hostname); Port Number; URI path prefix. A partition can have one or more virtual targets associated with it (via the partition's available targets list). Similar to a virtual host, a virtual target provides the capability to specify one or more hostnames, an optional URI path prefix and an optional port number. If an incoming request matches this information on any of the virtual targets associated with a partition, then it is assumed that the request is intended for applications in that partition.

Targeting of Partition Resources

In accordance with an embodiment, the use of a virtual target virtualizes the target for a resource group, which makes the resource group configuration portable without having any attributes of the physical resources, thus allowing a system administrator change the physical topology of the system without affecting the clients of the partition. Targeting is specified at the resource group level, and applies to all resources contained in the resource group. A set of available targets and a default target can be specified at the partition level. A virtual target can be targetable to a managed server or cluster, or to multiple servers or clusters, and can be shared by more than one resource group in the same partition.

If the resource group has targets specified, then those will be used as targets for the resources contained within the resource group. If the resource group does not have targets specified, but the default target at the partition level is set, then that will be used as the target for all resources contained within the resource group. If the resource group does not have targets specified and the default target at the partition level is not set, then the resources in the resource group will not be targeted.

In the simple case, where there is one target, or all resource groups are targeted to one cluster or a managed server, the cluster or managed server can be specified in the virtual target and the same virtual target can be the default target for a partition. In such a case the resource groups are not required to be specifically targeted to the virtual target.

Application Deployment and Configuration

In accordance with an embodiment, applications and shared libraries can be deployed to a resource group within a partition. Application configuration can be overridden using deployment plan mechanisms provided by the application server. Deployment plans can be specified per application per partition, or as part of a resource group.

Networking Layer

In accordance with an embodiment, the system can include a networking layer that associates incoming requests with a partition ID. The association can be made for all the network protocols including http/https traffic, RMI/T3, RMI/IIOP and other protocols. For example, based on a request URL (e.g., a virtual target/virtual host plus optional path), the networking layer can determine a target partition for the request, and add the determined partition ID to the request's execution context. If each partition is configured to use a unique virtual target and network access point (NAP) combination, then the system can map all requests on a particular virtual target to the corresponding partition. If partitions are instead configured to share the same host name in virtual targets, then a URI prefix can be defined for the virtual target, so that the system can determine the appropriate partition based on the virtual target plus configured URI prefix.

Work Manager

In accordance with an embodiment, the system can include partition-aware work managers. Each work manager can be configured with a relative priority of workload, together with a minimum threads constraint to ensure that a thread is always available for processing work requests to avoid deadlock, and a maximum threads constraint to limit the number of concurrent threads executing requests. A partition-specific work manager can be created for each partition, to ensure that applications within each partition do not exceed their configured fair share of thread resource usage for that partition.

Security Realms

In accordance with an embodiment, each partition can reference a security realm. Realms can also be referenced by multiple partitions. When a request enters the system, the system can determine the appropriate partition from the virtual target, and store the partition ID in the request's execution context. Subsequently, when an authentication or authorization action is required, the system can utilize the partition ID to determine the appropriate realm to use.

JNDI

In accordance with an embodiment, a partition-aware JNDI framework enables applications to bind named objects and retrieve them on a per-partition basis. During startup and deployment time, application server containers can associate each partition-specific application with a corresponding partition ID. The JNDI framework can then utilize that partition ID during a bind or lookup of a named object. Partition-specific objects can be isolated from other partitions, which allows different instances of the same application to register partition-specific objects with the same JNDI name.

Namespace and Scoping

In accordance with an embodiment, the named components of a partition, for example, resource groups, applications can be scoped to a partition. A partition is scoped to a domain. Resource group templates are defined and scoped at the domain and must be unique across the domain. Resources and applications defined in a resource group template are scoped to the resource group template. If a partition refers to more than one resource group template, the names of resources that are defined in the resource group templates being referred need to be unique across them.

Runtime MBeans

In accordance with an embodiment, a ServerRuntimeM-Bean acts as the root node in the runtime MBean tree. This hierarchy contains all of the runtime MBeans for the application server including clusters, server channels, JTA, and application resources. The system can include a partition-specific branch for each partition to the ServerRuntime MBean, including that the PartitionRuntimeMBean will contain component specific MBeans for application server subsystems including JMS, JDBC, Deployment, WLDF, Coherence, and Connectors. Runtime MBeans for partition-specific resources exist in the partition-specific hierarchy and not in the global hierarchy at the ServerRuntime MBean level, which allows for partition-specific monitoring and statistics.

REST Administration APIs

In accordance with an embodiment, a REST interface can be provided. RESTful resources provide significant benefits in the administration of middleware: The reliance on http/https protocols means that access can be enabled and controlled using standard firewalls and front end host configurations. This is especially important in an MT environment, where a particular partition administrator might be permitted access to only a narrow slice of the ports and channels supported by the application server domain.

Multi-Edit Sessions

In accordance with an embodiment, the system can support multi-edit sessions. A partition administrator can change any of the partition related configuration in a named specific edit session. APIs associated with the ConfigurationManagerMBean allow for start/save/activate of partition-specific edit sessions.

End-to-End Lifecycle Management

In accordance with an embodiment, providers can be used to wire infrastructure components needed to run a particular application, for example Oracle Traffic Director (OTD), database, Coherence, or JMS components. For example, in some embodiments, the partition-specific instances of a particular application can share a same database instance. A resource group template can refer to a domain-level JDBC system resource for the single database instance, and all partitions which reference that resource group template can then use the same database instance. In accordance with an embodiment, the several partition-specific instances of an application can connect to different database instances with common, or compatible schemas. The resource group template can declare a JDBC system resource, leaving some of the configuration to be specified in the respective partition sections of the configuration file (e.g., config.xml). Examples of such partition-level configuration for data sources can include a URL to which to connect, and/or the user credentials for authenticating and authorizing access to the referenced database instance.

In accordance with an embodiment, the data source implementation can create a separate physical connection pool for each partition to an assigned PDB within a container database, which allows the PDBs to appear to the application server as separate databases, and each partition's specific credentials to be used to establish one or more connections for the partition within that partition's pool. Alternatively, the system can support connection-switching across PDBs, in which a separate PDB can be provided for each partition, but the data source implementation shares a single connection pool to the container database which owns the PDBs. When an application submits data requests, it does so in the context of a partition. The system can then use the partition ID to switch a shared connection to the correct partition context, before executing the request on that connection.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting multi-tenancy in a cloud or other computing environment, comprising:
one or more computers including one or more processors and a cloud computing environment executing thereon, and having a domain configuration that is used at runtime to define a domain for execution of software applications, and a plurality of partitions of the domain, wherein each partition defines configuration data which operates to bind a configuration of resources deployable within the domain to specific values associated with the partition;
wherein each partition is associated with one or more virtual targets, wherein an incoming request matching a virtual target is associated with a partition context and partition identifier and directed to applications in that partition;
wherein each partition-level resource group within a partition is associated with a virtual target information that defines a target to which that resource group is deployed, wherein each partition is bound to a partition-specific database resource for use by a tenant, including that:
a partition table is used to providing a mapping from one or more of a hostname to a partition name;
a first partition includes a first partition-level resource group that contains one or more resources or applications for use with the first partition and wherein the first partition-level resource group is bound to a first partition-specific database resource for use by a first tenant and is accessible via a first virtual target; and
a second partition includes a second partition-level resource group that contains one or more resources or applications for use with the second partition and wherein the second partition-level resource group is bound to a second partition-specific database resource for use by a second tenant and is accessible via a second virtual target;
wherein a resource group contained within a partition can reference a domain-level resource group that provides a collection of resources or applications that are shareable among the plurality of partitions, wherein the configuration data associated with the partition is used to bind the applications or resources shareable among the plurality of partitions and defined at the domain-level with the resource group contained within the partition;
wherein the first and second virtual targets associated with the first and second partition-level resource groups are mapped to one or more servers, for use in directing requests to the partitions; and
wherein software applications deployed to a particular partition execute at a virtual target and with the resources or applications associated with the particular partition, including wherein upon receipt of a request directed to the particular partition, the system adds the partition identifier to an execution context associated with the received request, and executes the request at the resources or applications contained within the particular partition's resource groups.

2. The system of claim 1, wherein the system enables one or more partitions to be associated with a tenant, and a partition-specific database resource, for use by the tenant.

3. The system of claim 1, wherein the system is provided within a cloud environment that enables one or more partitions to be associated with a tenant for use by the tenant;
wherein a partition identifier is associated with a tenant identifier; and
wherein a tenant-aware application enables use of the tenant identifier to handle multiple tenants that are using a single instance of the tenant-aware application.

4. The system of claim 1, wherein:
a first partition is associated with a first partition identifier, and a first plurality of resources associated with the first partition, and is accessible by a first tenant and clients associated therewith; and
a second partition is associated with a second partition identifier, and a second plurality of resources associated with the second partition, and is accessible by a second tenant and clients associated therewith.

5. The system of claim 1, wherein a partition-level resource group can reference a resource group template that binds resources of the resource group template to partition-specific values, including wherein a partition object containing the resource group sets the value of tokens in the resource group template, for use during activating the resource group template for the partition-level resource group.

6. The system of claim 1, wherein a networking layer associates incoming requests with partition identifiers based on a request Uniform Resource Locator (URL), and wherein the networking layer determines a target partition identifier for the received request, and adds the determined target partition identifier to the received request's execution context.

7. A method for supporting multi-tenancy in a cloud computing environment, comprising:
providing one or more computers including one or more processors and a cloud computing environment executing thereon, and having a domain configuration that is used at runtime to define a domain for execution of software applications, and a plurality of partitions of the domain, wherein each partition defines configuration data which operates to bind a configuration of resources deployable within the domain to specific values associated with the partition;
wherein each partition is associated with one or more virtual targets, wherein an incoming request matching a virtual target is associated with a partition context and partition identifier and directed to applications in that partition;
associating each partition-level resource group within a partition with a virtual target information that defines a target to which that resource group is deployed, wherein each partition is bound to a partition-specific database resource for use by a tenant, including that:
a partition table is used to providing a mapping from one or more of a hostname to a partition name;
a first partition includes a first partition-level resource group that contains one or more resources or applications for use with the first partition and wherein the first partition-level resource group is bound to a first partition-specific database resource for use by a first tenant and is accessible via a first virtual target; and
a second partition includes a second partition-level resource group that contains one or more resources or applications for use with the second partition and wherein the second partition-level resource group is bound to a second partition-specific database resource for use by a second tenant and is accessible via a second virtual target;
wherein a resource group contained within a partition can reference a domain-level resource group that provides a collection of resources or applications that are shareable among the plurality of partitions, wherein the configuration data associated with the partition is used to bind the applications or resources shareable among the plurality of partitions and defined at the domain-level with the resource group contained within the partition;
wherein the first and second virtual targets associated with the first and second partition-level resource groups are mapped to one or more servers, for use in directing requests to the partitions; and
wherein software applications deployed to a particular partition execute at a virtual target and with the resources or applications associated with the particular partition, including wherein upon receipt of a request directed to the particular partition, the system adds the partition identifier to an execution context associated with the received request, and executes the request at the resources or applications contained within the particular partition's resource groups.

8. The method of claim 7, wherein the system enables one or more partitions to be associated with a tenant, and a partition-specific database resource, for use by the tenant.

9. The method of claim 7, wherein the system is provided within a cloud environment that enables one or more partitions to be associated with a tenant for use by the tenant;
wherein a partition identifier is associated with a tenant identifier; and
wherein a tenant-aware application enables use of the tenant identifier to handle multiple tenants that are using a single instance of the tenant-aware application.

10. The method of claim 7, wherein:
a first partition is associated with a first partition identifier, and a first plurality of resources associated with the first partition, and is accessible by a first tenant and clients associated therewith; and
a second partition is associated with a second partition identifier, and a second plurality of resources associated with the second partition, and is accessible by a second tenant and clients associated therewith.

11. The method of claim 7, wherein a partition-level resource group can reference a resource group template that binds resources of the resource group template to partition-specific values, including wherein a partition object containing the resource group sets the value of tokens in the resource group template, for use during activating the resource group template for the partition-level resource group.

12. The method of claim 7, wherein a networking layer associates incoming requests with partition identifiers based on a request Uniform Resource Locator (URL), and wherein the networking layer determines a target partition identifier for the received request, and adds the determined target partition identifier to the received request's execution context.

13. A non-transitory computer readable storage medium, including instructions stored thereon which when read and executed by one or more computers cause the one or more computers to perform a method comprising:
providing one or more computers including one or more processors and a cloud computing environment executing thereon, and having a domain configuration that is used at runtime to define a domain for execution of software applications, and a plurality of partitions of the domain, wherein each partition defines configuration data which operates to bind a configuration of resources deployable within the domain to specific values associated with the partition;
wherein each partition is associated with one or more virtual targets, wherein an incoming request matching a virtual target is associated with a partition context and partition identifier and directed to applications in that partition;
associating each partition-level resource group within a partition with a virtual target information that defines a target to which that resource group is deployed, wherein each partition is bound to a partition-specific database resource for use by a tenant, including that:
a partition table is used to providing a mapping from one or more of a hostname to a partition name;
a first partition includes a first partition-level resource group that contains one or more resources or applications for use with the first partition and wherein the first partition-level resource group is bound to a first partition-specific database resource for use by a first tenant and is accessible via a first virtual target; and
a second partition includes a second partition-level resource group that contains one or more resources or applications for use with the second partition and wherein the second partition-level resource group is bound to a second partition-specific database resource for use by a second tenant and is accessible via a second virtual target;
wherein a resource group contained within a partition can reference a domain-level resource group that provides a collection of resources or applications that are shareable among the plurality of partitions, wherein the configuration data associated with the partition is used to bind the applications or resources shareable among the plurality of partitions and defined at the domain-level with the resource group contained within the partition;
wherein the first and second virtual targets associated with the first and second partition-level resource groups are mapped to one or more servers, for use in directing requests to the partitions; and
wherein software applications deployed to a particular partition execute at a virtual target and with the resources or applications associated with the particular partition, including wherein upon receipt of a request directed to the particular partition, the system adds the partition identifier to an execution context associated with the received request, and executes the request at the resources or applications contained within the particular partition's resource groups.

14. The non-transitory computer readable storage medium of claim 13, wherein the system enables one or more partitions to be associated with a tenant, and a partition-specific database resource, for use by the tenant.

15. The non-transitory computer readable storage medium of claim 13, wherein the system is provided within a cloud environment that enables one or more partitions to be associated with a tenant for use by the tenant;
wherein a partition identifier is associated with a tenant identifier; and
wherein a tenant-aware application enables use of the tenant identifier to handle multiple tenants that are using a single instance of the tenant-aware application.

16. The non-transitory computer readable storage medium of claim 13, wherein:
a first partition is associated with a first partition identifier, and a first plurality of resources associated with the first partition, and is accessible by a first tenant and clients associated therewith; and
a second partition is associated with a second partition identifier, and a second plurality of resources associated with the second partition, and is accessible by a second tenant and clients associated therewith.

17. The non-transitory computer readable storage medium of claim 13, wherein a partition-level resource group can reference a resource group template that binds resources of the resource group template to partition-specific values, including wherein a partition object containing the resource group sets the value of tokens in the resource group template, for use during activating the resource group template for the partition-level resource group.

18. The non-transitory computer readable storage medium of claim 13, wherein a networking layer associates incoming requests with partition identifiers based on a request Uniform Resource Locator (URL), and wherein the networking layer determines a target partition identifier for the received request, and adds the determined target partition identifier to the received request's execution context.

19. The system of claim 1, wherein the system includes one or more container/request handlers for mapping of hosts to partitions wherein each container/request handler operates to establish the partition context associated with a received request and push the partition context onto an invocation context manager for subsequent use.

20. The method of claim 7, further comprising providing one or more container/request handlers for mapping of hosts to partitions wherein each container/request handler operates to establish the partition context associated with a received request and push the partition context onto an invocation context manager for subsequent use.

\* \* \* \* \*

UNITED STATES PATENT AND TRADEMARK OFFICE
CERTIFICATE OF CORRECTION

| | | |
|---|---|---|
| PATENT NO. | : 12,250,267 B2 | Page 1 of 1 |
| APPLICATION NO. | : 17/967683 | |
| DATED | : March 11, 2025 | |
| INVENTOR(S) | : Mordani et al. | |

It is certified that error appears in the above-identified patent and that said Letters Patent is hereby corrected as shown below:

In the Specification

In Column 6, Line 27, delete "\${CRM Data Username}." and insert -- \${CRMDataUsername}. --, therefor.

Signed and Sealed this
Third Day of June, 2025

Coke Morgan Stewart
*Acting Director of the United States Patent and Trademark Office*